United States Patent
Yaworski et al.

(10) Patent No.: US 11,908,594 B2
(45) Date of Patent: Feb. 20, 2024

(54) METHOD FOR MONITORING AN ELECTRICAL CABLE ACCESSORY SYSTEM

(71) Applicant: TE Connectivity Services GmbH, Schaffhausen (CH)

(72) Inventors: Harry George Yaworski, Holly Springs, NC (US); Kavitha Bharadwaj, Fremont, CA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 44 days.

(21) Appl. No.: 17/400,434

(22) Filed: Aug. 12, 2021

(65) Prior Publication Data
US 2022/0059259 A1 Feb. 24, 2022

Related U.S. Application Data

(60) Provisional application No. 63/067,949, filed on Aug. 20, 2020.

(51) Int. Cl.
*H01B 19/00* (2006.01)
*G01N 21/78* (2006.01)
(Continued)

(52) U.S. Cl.
CPC ............ *H01B 19/00* (2013.01); *G01N 21/78* (2013.01); *G04F 13/02* (2013.01); *H02G 15/184* (2013.01); *Y10T 29/49227* (2015.01)

(58) Field of Classification Search
CPC ........ H01B 19/00; H01B 7/183; H01B 7/324; H01B 9/005; G01K 11/12; G01K 3/04; D07B 1/145; Y10T 29/49227
(Continued)

(56) References Cited

U.S. PATENT DOCUMENTS 5,053,339 A 10/1991 Patel
7,232,253 B2 6/2007 Isbitsky et al.
(Continued)

FOREIGN PATENT DOCUMENTS

EP 2728328 A1 5/2014
JP 2015520850 A 7/2015

OTHER PUBLICATIONS

International Search Report and the Written Opinion of the International Searching Authority in corresponding PCT Application No. PCT/IB2021/057678 (14 pages) (dated Nov. 10, 2021).

*Primary Examiner* — Thiem D Phan

(57) ABSTRACT

The present disclosure describes an electrical cable accessory system for covering an electrical cable and/or cable connection. The electrical cable accessory system includes a pre-expanded cable accessory unit and a time-temperature indicator associated with the pre-expanded cable accessory unit. The pre-expanded cable accessory unit includes a pre-expanded cable accessory formed of an elastomeric material and a removable holdout mounted within the elastomeric cable accessory, wherein the holdout is operative to maintain the elastomeric cable accessory in an expanded state and to permit the elastomeric cable accessory to elastically contract when the holdout is removed from the elastomeric cable accessory. The time-temperature indicator is configured to undergo a visible change in appearance in response to a cumulative heat exposure and signal to a viewer when the elastomeric material of the pre-expanded elastomeric cable accessory unit has experienced a threshold cumulative heat exposure. Methods including the same are also described herein.

11 Claims, 9 Drawing Sheets

(51) Int. Cl.
*G04F 13/02* (2006.01)
*H02G 15/184* (2006.01)

(58) Field of Classification Search
USPC .................. 29/887, 428, 593, 595, 888.3
See application file for complete search history.

(56) References Cited

U.S. PATENT DOCUMENTS

| | | | |
|---|---|---|---|
| 8,502,076 B2 * | 8/2013 | Luzzi | H01R 4/72 |
| | | | 174/93 |
| 8,889,989 B2 | 11/2014 | Maher | |
| 8,973,835 B2 * | 3/2015 | Salzman | G06Q 10/08 |
| | | | 235/492 |
| 9,870,848 B2 | 1/2018 | Iyer | |
| 10,283,878 B2 | 5/2019 | Newman | |
| 10,514,340 B2 | 12/2019 | Prusik et al. | |
| 2012/0079981 A1 | 4/2012 | Huffman et al. | |
| 2014/0076627 A1 | 3/2014 | Maher | |
| 2018/0321159 A1 | 11/2018 | Prusik et al. | |

* cited by examiner

Before Heat Exposure

After Excessive Heat Exposure

METHOD FOR MONITORING AN ELECTRICAL CABLE ACCESSORY SYSTEM

RELATED APPLICATION(S)

The present application claims priority to and the benefit of U.S. Provisional Patent Application Ser. No. 63/067,949, filed Aug. 20, 2020, the disclosure of which is hereby incorporated herein in full.

FIELD

The present invention relates to electrical cables and connections and, more particularly, to protective pre-expanded cable accessory units for electrical cables and electrical connections.

BACKGROUND

Elastomeric covers and cover assemblies are commonly employed to protect or shield electrical power cables (e.g., low voltage cables up to about 1000 V and medium voltage cables up to about 46 kV) and connections (e.g., splices or terminations). Such elastomeric covers may be cold shrinkable sleeves that are provided in the form of a pre-expanded cover unit that includes the sleeve and a holdout with the sleeve pre-mounted, in an expanded condition, on the holdout. The elastomeric covers may be provided to an end user (e.g., customer or installer) in this form for ease and consistency in installing the cover on a cable or connection. The pre-expanded cover unit may be stored by the manufacturer or customer for an extended period.

Embodiments of the present invention are directed to an electrical cable accessory system for covering an electrical cable and/or cable connection. The electrical cable accessory system includes a pre-expanded cable accessory unit and a time-temperature indicator associated with the pre-expanded cable accessory unit. The pre-expanded cable accessory unit includes a pre-expanded cable accessory formed of an elastomeric material and a removable holdout mounted within the elastomeric cable accessory, wherein the holdout is operative to maintain the elastomeric cable accessory in an expanded state and to permit the elastomeric cable accessory to elastically contract when the holdout is removed from the elastomeric cable accessory. The time-temperature indicator is configured to undergo a visible change in appearance in response to a cumulative heat exposure and signal to a viewer when the elastomeric material of the pre-expanded elastomeric cable accessory unit has experienced a threshold cumulative heat exposure.

Further embodiments of the present invention are directed to methods for monitoring cumulative heat exposure to a pre-expanded elastomeric cable accessory unit for covering an electrical cable and/or cable connection. A method includes providing an electrical cable accessory system including a pre-expanded cable accessory unit and a time-temperature indicator associated with the pre-expanded cable accessory unit. The pre-expanded cable accessory unit includes a pre-expanded cable accessory formed of an elastomeric material and a removable holdout mounted within the elastomeric cable accessory, wherein the holdout is operative to maintain the elastomeric cable accessory in an expanded state and to permit the elastomeric cable accessory to elastically contract when the holdout is removed from the elastomeric cable accessory. The time-temperature indicator is configured to undergo a visible change in appearance in response to a cumulative heat exposure. The method further includes monitoring the visible change in appearance of the time-temperature indicator to determine whether the elastomeric material of the pre-expanded elastomeric cable accessory unit has experienced a threshold cumulative heat exposure.

Further embodiments of the present invention are directed to methods of making an electrical cable accessory system for monitoring cumulative heat exposure to a pre-expanded elastomeric cable accessory unit. A method includes providing an electrical cable accessory system including a pre-expanded cable accessory unit and a time-temperature indicator associated with the pre-expanded cable accessory unit. The pre-expanded cable accessory unit includes a pre-expanded cable accessory formed of an elastomeric material, and a removable holdout mounted within the elastomeric cable accessory, wherein the holdout is operative to maintain the elastomeric cable accessory in an expanded state and to permit the elastomeric cable accessory to elastically contract when the holdout is removed from the elastomeric cable accessory. The time-temperature indicator is configured to undergo a visible change in appearance in response to a cumulative heat exposure. The method further includes affixing the time-temperature indictor to the pre-expanded cable accessory unit or to a packaging containing the pre-expanded cable accessory unit.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
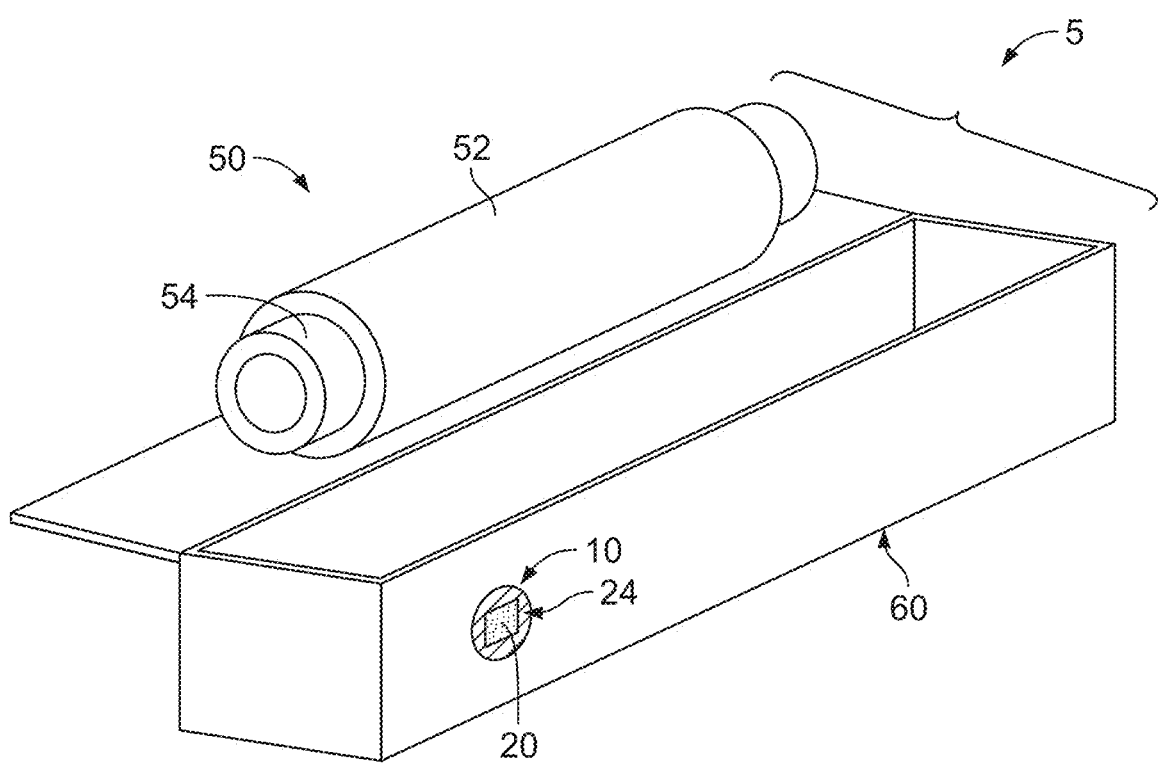
FIG. 1 is a perspective view of an electrical cable accessory system according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are directed to an electrical cable accessory system including a pre-expanded cable accessory unit. The pre-expanded cable accessory unit includes an elastomeric cable accessory and a holdout. The electrical cable accessory system may further include packaging that contains or holds the pre-expanded cable accessory unit. The cable accessory is mounted on the holdout such that the holdout holds the cable accessory in an elastically expanded (e.g., radially expanded) state. In use, the cable accessory can be deployed onto a cable or cable connection from the holdout so that the cable accessory radially elastically contracts about the cable or cable connection.

The electrical cable accessory system further includes a time-temperature indicator associated with the pre-expanded cable accessory unit. In some embodiments, the time-temperature indicator is mounted on packaging associated with the cable accessory. In some embodiments, the time-temperature indicator is mounted on the cable accessory. In some embodiments, the time-temperature indicator is mounted on a portion of the pre-expanded cable accessory unit other than the cable accessory. The time-temperature indicator is configured to undergo an optical, visual, or visible change in appearance in response to a cumulative heat exposure. In use, a user can refer to the time-temperature indicator to determine whether the expanded cable accessory, which experiences the same or substantially the same cumulative heat exposure as the time-temperature indicator, has reached, experienced or been subjected to a prescribed threshold cumulative heat exposure.

The elastomeric cable accessory may be any suitable type of elastomeric cable accessory. In some embodiments, the elastomeric cable accessory is a tubular elastomeric cover sleeve. In some embodiments, the elastomeric cable accessory is a joint body, a termination cover, an elbow, a re-jacket sleeve, a breakout sleeve, a cable adapter, or other cable accessory.

The pre-expanded cable accessory unit may include other components mounted on the holdout in addition to the pre-expanded elastomeric cable accessory. In some embodiments, the pre-expanded cable accessory unit further includes a second elastomeric cable accessory mounted on the holdout such that the holdout holds the second elastomeric cable accessory in an elastically expanded (e.g., radially expanded) state as well. For example, the pre-expanded cable accessory unit may include a pre-expanded joint body mounted on (and held expanded by) the holdout as a first expanded elastomeric cable accessory, and a re-jacket sleeve mounted on (and held expanded by) the holdout as a second expanded elastomeric cable accessory. Additional, non-elastomeric or non-elastically expanded components may be mounted on the holdout as well, such as a metal shield mesh sleeve.

In some embodiments, the cover sleeve is a cold shrink elastomeric cable accessory (e.g., a cold shrink cover sleeve). As used herein, "cold shrink" or "cold shrink cover" means that the cover or component can be shrunk or contracted about a substrate (e.g., a cable) without requiring the use of applied heat. As used herein, "cold-applied" or "cold-applied cover" means that the cover or component can be assembled or installed about a substrate (e.g., a cable) without requiring the use of applied heat at the time of installation.

The inventive electrical cable accessory system can address problems and concerns associated with aging and degradation of pre-expanded elastomeric cable accessories provided in pre-expanded cable accessory units. Cold shrink cable accessories rely on stretched elastomeric materials that relax based on (as a function of) time and temperature exposure. This compression may be important or critical to ensure proper sealing and/or dielectric strength.

Once a cold shrink cable accessory has been exposed to a cumulative amount of heat (i.e., heat energy) that exceeds a threshold cumulative amount of heat, it may no longer retain sufficient resilience to apply an intended minimum amount of compression pressure to the substrate(s) (e.g., the cable). As used herein, "excessive heat exposure" means that the elastomeric cable accessory has been exposed to a cumulative amount of heat exceeding a predetermined threshold cumulative amount of heat.

For this reason, such products are commonly provided with an expiration date that provides a rough estimate of the effective shelf life of the cold shrink cable accessory to the user or customer. Because the manufacture cannot predict the actual conditions of handling and storing the product, the expiration date may be based on conservative assumptions. As a result, a pre-expanded cable accessory unit may reach its expiration date before its cover sleeve has in fact relaxed or heat aged beyond its effective limit. The time-temperature indicator of the electrical cable accessory system addresses this problem by providing a more accurate and individualized assessment, indication or measurement of the heat aging of the expanded cable accessory of the associated pre-expanded cable accessory unit. Thus, the time-temperature indicator can serve as a shelf life indicator for the cable accessory, and form a shelf life indicator system (or a part of a shelf life indicator system) of the electrical cable accessory system.

Embodiments of the present invention will now be discussed in greater detail below with reference to FIGS. 1-11.

An electrical cable accessory system according to some embodiments of the present invention, designated broadly at 5, is illustrated in FIG. 1. The electrical cable accessory system 5 includes a time-temperature indicator 10. The time-temperature indicator 10 may also be referred to herein as a "shelf life indicator". The electrical cable accessory system 5 also includes a pre-expanded cable accessory unit 50. In some embodiments, the electrical cable accessory system 5 may optionally include packaging 60.

The pre-expanded cable accessory unit 50 includes a pre-expanded elastomeric cable accessory 52 and a holdout device 54. As shown in FIG. 1, in some embodiments, the pre-expanded elastomeric cable accessory 50 may be a cover assembly or cover sleeve 52 that is held in an expanded state or position on the holdout 54. The pre-expanded elastomeric cable accessory 52 may be mounted on the holdout 54 to form a unitary or one piece structure.

The holdout 54 maintains the pre-expanded elastomeric cable accessory 52 in an elastically expanded state (e.g., the outer diameter of the holdout 54 is greater than the inner diameter of the cable accessory 52 when the cable accessory 52 is relaxed). The holdout 54 is configured to retain the cable accessory 52 in an expanded position until removed from the cable accessory unit 50. The pre-expanded cable accessory unit 50 may be deployed and mounted on an intended substrate (e.g., a cable) in a retracted state or position. According to some embodiments, in the expanded state, the cable accessory 52 is expanded in the range of from about 200 to 400 percent of its relaxed diameter (i.e., not on a substrate). As a result, the cable accessory 52 of the pre-expanded cable accessory unit 50 will exert a radially compressive pressure or load on the holdout 54. According to some embodiments, the pre-expanded elastomeric cable accessory 52 may be a cold shrink cover sleeve.

In some embodiments, the holdout 54 is a disintegratable or collapsible rigid tube. According to some embodiments, the holdout 54 is what is commonly referred to as a spiral holdout or core. Some embodiments provide that the holdout 54 is a non-spiral core that may be removable and/or retractable. The holdout 54 may include a tubular, cylindrical member, or body. In some embodiments, the holdout 54 includes a continuous, flexible ribbon or strip that is helically wound to form a series of looped strip segments. The segments may be releasably or detachably joined to the respective adjacent segments along their edges to thereby form or constitute the holdout body in the form of a rigid, tubular cylinder.

The holdout 54 can be formed of any suitable material. According to some embodiments, the holdout 54 is formed of a semi-rigid polymeric material. According to some embodiments, the holdout 54 is formed of high density polyethylene (HDPE), low density polyethylene (LDPE), polypropylene, ABS, or PVC. According to some embodiments, the pre-expanded cable accessory 52 is formed of a dielectric or electrically insulative material. According to some embodiments, the cable accessory 52 is formed of an elastically expandable material. According to some embodiments, the cable accessory 52 is formed of an elastomeric material. According to some embodiments, the cable accessory 52 is formed of liquid silicone rubber (LSR). Other suitable materials may include EPDM or ethylene propylene rubber (EPR).

When the holdout 54 is withdrawn (unraveled), the cable accessory 52 shrinks towards the intended substrate (I.e., cable). The relaxed inner diameter of the cable accessory 52 is less than at least the outer diameter of the jacket and the outer diameter of the semiconductor layer of the cable. Therefore, the cable accessory 52 exerts a persistent radially inwardly compressive or clamping force or pressure (due to elastic tension) onto the cable. The cable accessory 52 may thereby effect a liquid tight seal at the interface between the cable and the cable accessory 52. This seal can protect the cable (and the connection) from the ingress of environmental moisture. According to some embodiments, the relaxed inner diameter of the cable accessory 52 is between about 20 and 40 percent less than the smallest diameter cable upon which the cable accessory 52 is intended to be installed.

Figure 9A:
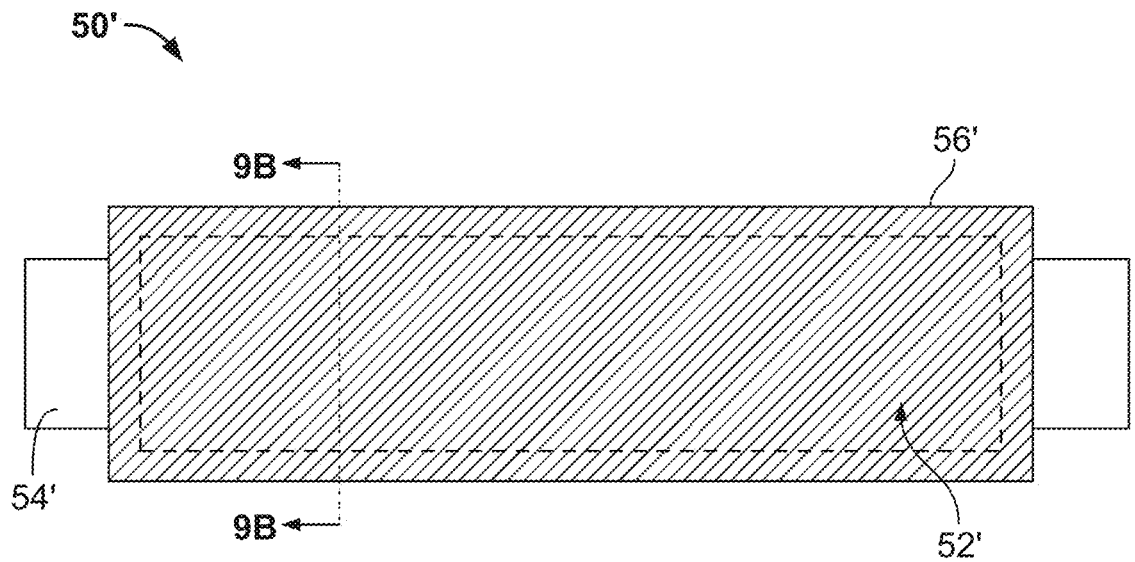
FIG. 9A is a side view of another example pre-expanded cable accessory unit according to embodiments of the present invention.
Figure 9B:
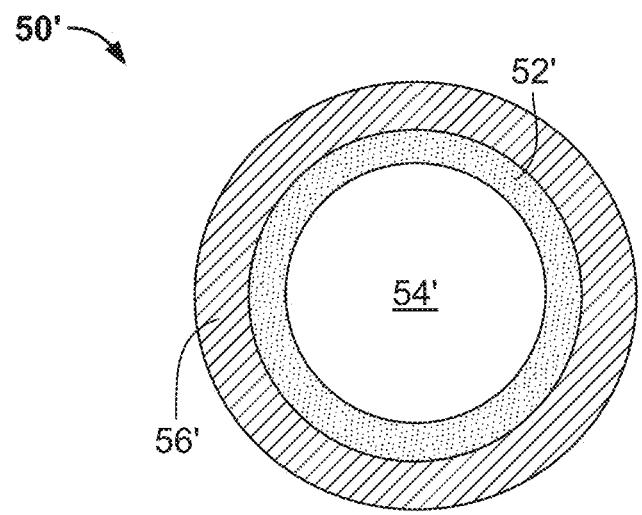
FIG. 9B is a cross-sectional view of the pre-expanded cable accessory unit of FIG. 9A taken along line 9B-9B.
Figure 10:
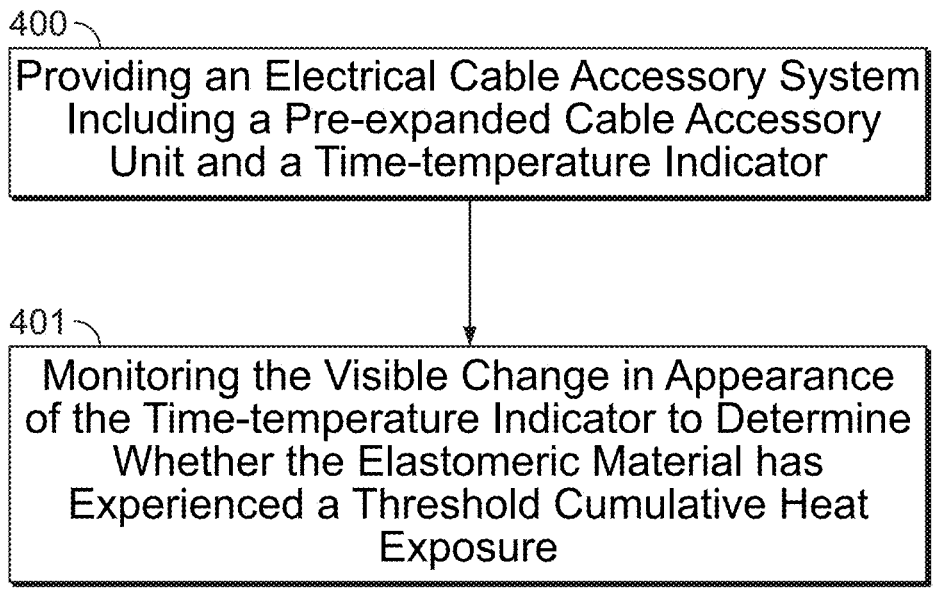
FIG. 10 is a flow diagram illustrating an example method for monitoring cumulative heat exposure to an electrical cable accessory system according to embodiments of the present invention.
Figure 11:
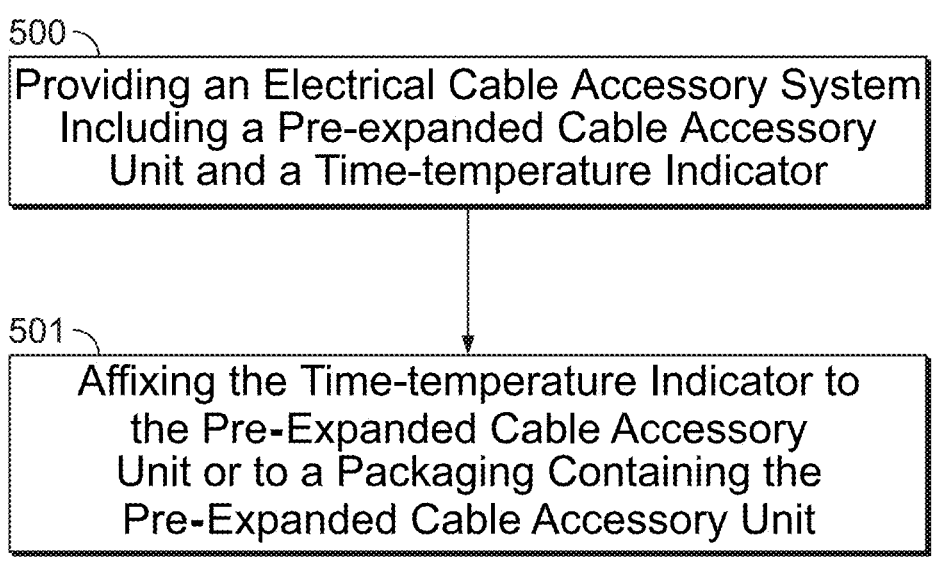
FIG. 11 is a flow diagram illustrating an example method of making an electrical cable accessory system for monitoring cumulative heat exposure to a pre-expanded elastomeric cable accessory unit according to embodiments of the present invention.

As shown in FIG. 1, the illustrated pre-expanded cable accessory unit 50 includes only a single pre-expanded elastomeric cable accessory 52; however, as discussed below it is contemplated that the pre-expanded cable accessory unit 50 may include two or more pre-expanded elastomeric cable accessories 52 (e.g., each of which is mounted on the holdout 54 in an elastically expanded state) as well as other components (e.g., metal mesh shielding) that form the pre-expanded cable accessory unit 50 (see, e.g., FIGS. 9A-9B).

Figure 3A:
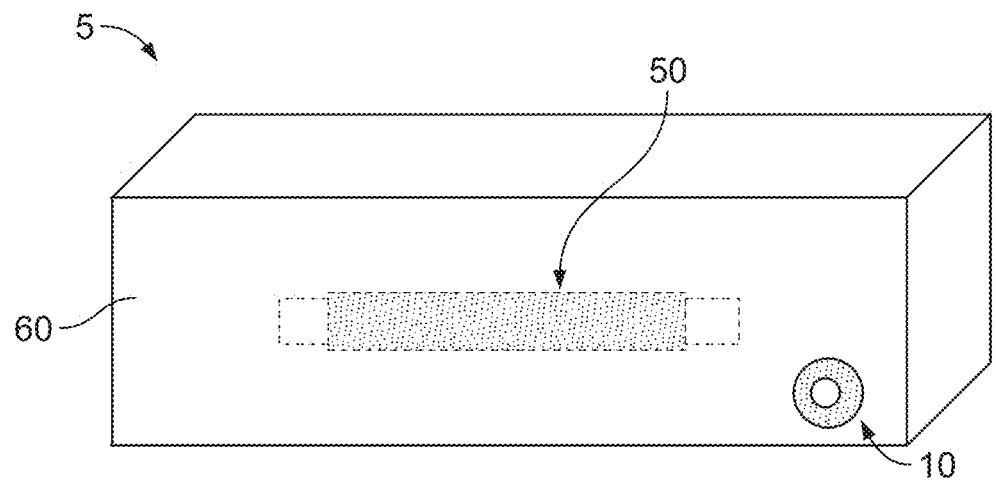
FIG. 3A illustrates the electrical cable accessory system of FIG. 1 before a threshold cumulative heat exposure has been reached, as shown by the time-temperature indicator of FIG. 2.
Figure 3B:
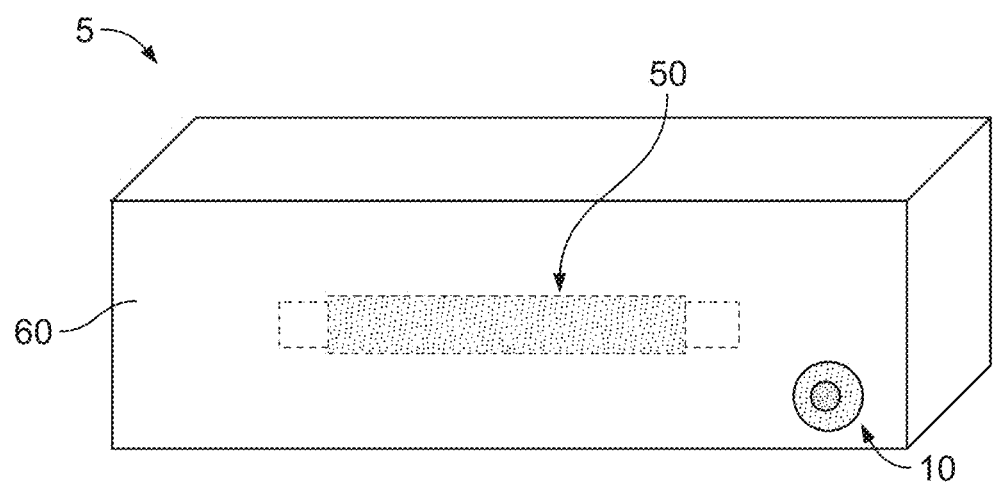
FIG. 3B illustrates the electrical cable accessory system of FIG. 1 after a threshold cumulative heat exposure has been reached, as shown by the time-temperature indicator of FIG. 2.

The pre-expanded cable accessory unit 50 may be disposed in the packaging 60 and is intended to remain in the packaging 60 until the pre-expanded cable accessory unit 50 is used or discarded. The packaging 60 is depicted in FIG. 1 and FIGS. 3A-3B (and FIGS. 8A-8B) as a box (e.g., a cardboard box), but other forms of packaging may be used instead. For example, the packaging 60 may be a bag, shrink wrap, or any other suitable packaging.

In some embodiments, the time-temperature indicator 10 is affixed to the packaging 60. For example, as shown in FIG. 1 and FIGS. 3A-3B (and FIGS. 7A-7B), the time-temperature indicator 10 is mounted on the packaging 60. In some embodiments, the time-temperature indicator 10 is affixed to the packaging 60 in a location visible to a user without opening the packaging 60 or accessing the pre-expanded cable accessory unit 50.

Example time-temperature indicators 10, 100 that may form part of the electrical cable accessory system 5, 500 of the present invention are illustrated in FIGS. 1-8B. The time-temperature indicator 10, 100 may be configured to monitor the cumulative heat exposure to the indicator 10, 100, and thereby the cumulative heat exposure to pre-expanded cable accessory unit 50 (and pre-expanded elastomeric cable accessory 52) that is maintained in the packaging 60 with the indicator 10, 100, for example, during shipment and/or storage of the electrical cable accessory system 5, 500. That is, the time-temperature indicator 10, 100 is arranged and configured to be exposed to a cumulative amount of heat substantially the same as or proportional to the cumulative amount of heat to which the elastomeric cable accessory 52 is exposed. The time-temperature indicator 10, 100 is configured to signal to a viewer when a predetermined cumulative heat exposure value that correlates or may correlate with a predetermined or predicted decline (or degradation) in the elastomeric properties of the pre-expanded elastomeric cable accessory 52 has been reached. In some embodiments, the predicted rate at which degradation in the elastomeric properties occurs and the threshold cumulative heat exposure are determined or modeled using experimentally obtained data and/or using a theoretical or analytical model or equation such as the Arrhenius equation.

As discussed in further detail below, in some embodiments, the signal may be a color change, for example a darkening of an indicator area 20 of the time-temperature indicator 10, and may be generated by a heat-sensing agent (i.e., heat-responsive agent) such as a diacetylenic compound, or another technology, that integrates the heat exposure over time. In some embodiments, the time-temperature indicator 10 is a thermochromic indicator. Examples of thermochromic indicators that may be used in association with the present invention are described in U.S. Pat. No. 10,514,340 to Prusik et al., the disclosure of which is incorporated by reference herein in its entirety. In some embodiments, the signal may be a migrating color change along an indicator area 200 of the time-temperature indicator 100, and may be generated by a viscous liquid that migrates along a migration medium, or another technology, that integrates the heat exposure overtime. In some embodiments, the time-temperature indicator 100 is a liquid migration (e.g., dye diffusion) indicator. Examples of liquid migration indicators that may be used in association with the present invention are described in U.S. Pat. No. 7,232,253 to Isbitsky et al., the disclosure of which is incorporated by reference herein in its entirety.

The term "color" as used herein includes achromatic visual appearances such as black, gray, and white, as well as chromatic appearances having primary color hues, secondary color hues and/or other color hues, such as, without limitation, red, yellow, green, blue, purple, orange, brown and other hues. The terms "color change" and its grammatical variants are used to refer to changes in hue, intensity, or lightness (or darkness) or other changes in visual appearance.

Figure 2:
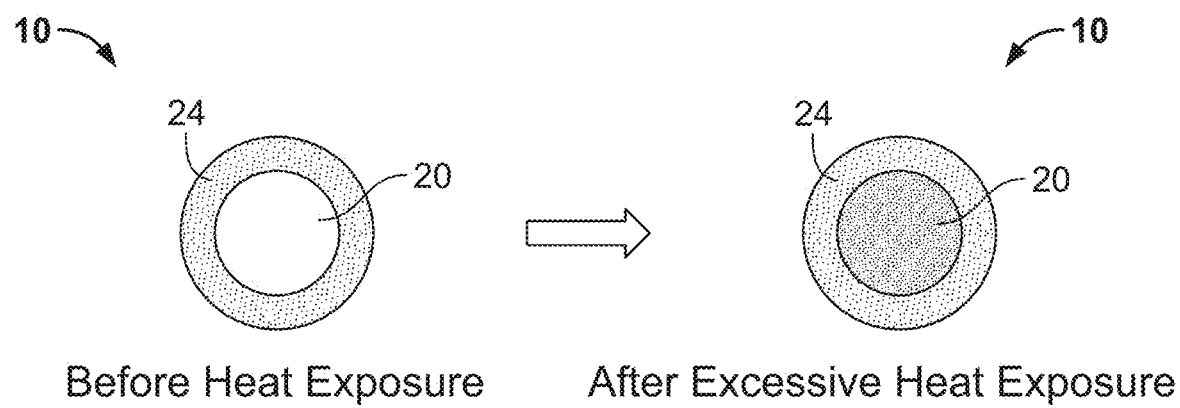
FIG. 2 illustrates a time-temperature indicator that may be utilized in the electrical cable accessory system of FIG. 1 before heat exposure and after excessive heat exposure according to embodiments of the present invention.

With references to FIGS. 1-4B, the time-temperature indicator is a thermochromic time-temperature indicator 10. As shown in FIG. 2 (see also FIGS. 3A-3B), in some embodiments, the time-temperature indicator 10 may include a viewable indicator area 20 for viewing a visible change in appearance corresponding to the cumulative heat exposure. In some embodiments, the visible change in appearance may comprise a darkening of the indicator area 20. In some embodiments, the indicator 10 may also include a colored reference area 24 adjacent to the indicator area 20. As shown in FIG. 2, in some embodiments, the reference area 24 may surround the indicator area 20.

In some embodiments, the indicator area 20 of the time-temperature indicator 10 may exhibit a distinct color change following activation of a color-changing composition that provides good contrast with the appearance of the indicator 10 (i.e., a reference area 24) before activation and a clear, irreversible, signal suggesting that adverse heat exposure may have occurred, for example, a significant darkening of the indicator area 20.

The reference area 24 may be colored to show an end point appearance of the indicator area 20. For example, in some embodiments, the indicator area 20 may initially have an appearance that is lighter than the appearance of the reference area 24 and the indicator area 20 is configured to darken as the indicator 10 (and associated pre-expanded elastomeric cable accessory 52) is exposed to heat over time (FIG. 2). In some embodiments, the time-temperature indicator 10 may be used to determine if the indicator 10 has experienced a threshold cumulative heat exposure. In some embodiments, the end point (i.e., threshold cumulative heat exposure) appearance may be a visible change in appearance such the indicator area 20 is similar in appearance or darker in appearance than the reference area 24, thereby indicating a probable condition of the associated pre-expanded elastomeric cable accessory unit 50, for example, that the pre-expanded elastomeric cable accessory 52 of the pre-expanded cable accessory unit 50 has lost efficacy or quality and should not be used (i.e., relaxation of the elastomeric material(s) forming the pre-expanded elastomeric cable accessory 52 and/or portions thereof).

The time-temperature indicator 10, indicator area 20, and reference area 24, each may have any desired shape. The shapes, considered independently, may be circular, square, rectangular, triangular, hexagonal, polygonal, elongated, circular, oval, elliptical, strip-like, another regular shape, an irregular shape, a shape representing a recognizable image such as a check mark, or another suitable shape. As shown in FIG. 1, by way of example, the indicator 10 is circular, the reference area 24 occupies a smaller circle, and the indicator area 20 is configured as a square within the circle of reference area 24. As shown in FIG. 2 and FIGS. 3A-3B, by way of example, the indicator 10, the reference area 24, and the indicator area 20 are each circular. In some embodiments, the reference area 24 and the indicator area 20 may each be rectangular, like reference area 240 and indicator area 200 of time-temperature indicator 100 shown in FIGS. 5-8B.

The size of the time-temperature indicator 10 may vary according to the intended application, or for other purposes.

In some embodiments, the indicator 10 may have a largest transverse dimension in the range of from about 5 mm to about 30 mm, for example, from about 10 mm to about 15 mm. In such an embodiment, the indicator area 20 may have a largest transverse dimension of from about 1 mm to about 10 mm, for example, from about 2 mm to about 6 mm.

The color-changing composition within the indicator area 20 of the time-temperature indicator 10 employed in some embodiments of the present invention may be or may include a heat-sensing agent (i.e., a heat-responsive agent). The heat-sensing agent may change appearance in response to heat and may function as a cumulative heat indicator in association with the rate of degradation of the elastomeric properties of the corresponding pre-expanded elastomeric cable accessory 52. For example, in some embodiments, the heat-sensing agent may darken in color with continued heat exposure (see, e.g., FIG. 2 and FIG. 3B), and the degree of darkening may provide a measure of the cumulative heat exposure to the electrical cable accessory system 5. Alternatively, the heat-sensing agent may exhibit another appearance change, for example, lightening, a change in hue, or another visibly readable indication. The heat-sensing agent may include one or more heat-sensitive compounds, some of which are described elsewhere herein.

The indicator area 20 of the time-temperature indicator 10 may be manufactured by applying a suitable indicator ink including the heat-sensing agent to a substrate, then drying the indicator ink on the substrate. The indicator area 20 may include the dried residue of the ink and the substrate supporting the ink residue. The indicator ink may include a liquid vehicle; a film-forming agent dissolved in the liquid vehicle, an insoluble heat-sensing agent dispersed in the liquid vehicle and various optional ingredients for example one or more dispersants, antiactinic agents, colorants, preservatives, fragrances, or other additives. An example of a suitable liquid vehicle is an organic solvent such as isopropanol, or ethyl 3-ethoxypropionate. An example of a suitable film-forming agent is nitrocellulose.

Some useful heat-sensing agents may provide an irreversible indication of cumulative temperature exposure over time, and may provide a long-lasting record of the heat exposure. The cumulative heat response of the heat-sensing agent may be such that the heat-sensing agent may monitor heat exposure as an integral of temperature over time. Further, the heat-sensing agent may be heat-sensitive and may have useful indicator reactivity at ambient temperatures likely to be encountered by a monitored host product, for example, temperatures in the range of from about 0° C. to about 60° C.

The heat-sensing agent may include, or consist of, any of a variety of chemical components. One useful example embodiment of heat-sensing agents includes one or more thermally sensitive diacetylenic compounds, for example, an individual diacetylenic compound or a co-crystallized mixture of two diacetylenic compounds.

The diacetylenic compound, or compounds, may polymerize to provide a color change or another optically readable indication. Diacetylenic compounds useful in the practice of the example embodiment of the invention include polymerizable diacetylenic compounds including at least two conjugated acetylenic groups, i.e., groups having the formula —C—C—. Some exemplary polymerizable diacetylenic compounds that may be employed include substituted 2,4-hexadiyn-1,6-bis(alkylurea) compounds wherein the alkyl group has from 1 to 20 carbon atoms, the foregoing diacetylenic bis(alkylurea) compounds wherein the alkyl substituents are linear, and co-crystallized mixtures of any two or more of the foregoing bis(alkylurea) compounds. The two alkyl groups in any of the foregoing diacetylenic bis(alkylurea) compounds may be the same and the bis(alkylurea) compounds may be symmetrically substituted. Some particular examples of the foregoing diacetylenic bis(alkylurea) compounds include ethyl, propyl, butyl, octyl, dodecyl and octyldecyl-substituted 2,4-hexadiyn-1,6-bis(alkylurea) compounds, linear isomers of these compounds and co-crystallized mixtures of two or more of the linear isomers.

Other chemistries and technologies that may be used as, or in, a heat-sensing agent for a cumulative exposure indicator component (e.g., the color-changing composition of the indicator area 20) of the time-temperature indicator 10 of the present invention include: heat-sensitive dyes that may be activated or de-activated by exposure to ultraviolet radiation to provide or remove color, dyes that are triggered to exhibit color, or change color, by pH changes; a reversibly photochromic compound, such as a compound that may undergo photo-induced coloration by irradiation with light or ultraviolet radiation, followed by a time- and temperature-dependent decoloration, for example, a spiroaromatic compound; and enzyme-based sensors. Other technologies further include enzyme based technology where a blister pack containing two components get mixed and then eventually the mixed components change color over time/temperature, as well as mechanical function (e.g., diffusion type) and chemical function (e.g., solid state polymerization). Still further suitable technologies for the indicator area 20 that may be employed in practicing embodiments of the present invention will be known or apparent to a person of ordinary skill in the art, in light of this disclosure, or will become known or apparent in the future.

As shown in FIG. 2 (see also FIGS. 3A-3B and FIGS. 5-7B), in some embodiments, the reference area 24 may help a viewer or viewing device judge the state of color-changing composition within the indicator area 20 by having an appearance similar to the appearance of indicator area 20 which will develop a visible change in appearance after a predetermined cumulative heat exposure occurs indicative of an end point (or threshold cumulative heat exposure) of the corresponding pre-expanded elastomeric cable accessory 52 for an electrical connection cover system 5. In some embodiments, the indicator area 20 may comprise indicia that indicates to a viewer how much shelf life is remaining. For example, as shown in FIG. 7, in some embodiments, the indicator area 200 includes indicia 150 that reflects the percentage of shelf life remaining.

In some embodiments, the threshold cumulative heat exposure for the pre-expanded cable accessory system 50 (I.e., the pre-expanded elastomeric cable accessory 52) may be about 40° C. (104° F.) over a time period of about two years. In some embodiments, the threshold cumulative heat exposure for the pre-expanded cable accessory system 50 (i.e., the pre-expanded elastomeric cable accessory 52) may be about 40° C. (104° F.) over a time period of about 730 days. In some embodiments, the threshold cumulative heat exposure for the pre-expanded cable accessory system 50 (i.e., the pre-expanded elastomeric cable accessory 52) may be about 60° C. (140° F.) over a time period of about 60 days. The threshold cumulative heat exposure will vary based on the material used and the tension set requirement of the pre-expanded cable accessory system 50 (i.e., the pre-expanded elastomeric cable accessory 52).

FIGS. 3A-3B (and FIG. 1) show a time-temperature indicator 10 attached to the packaging 60 containing a pre-expanded cable accessory unit 50. FIG. 3A illustrates an electrical cable accessory system 5 unit before excessive heat exposure. A pre-expanded cable accessory unit 50 is stored within packaging 60 having a time-temperature indicator 10 attached to an outer surface of the packaging 60. As shown in FIG. 3A, the indicator area 20 of the time-temperature indicator 10 is lighter in color than the reference area 24, which indicates to a viewer that the electrical cable accessory system 5 has not yet experienced a threshold cumulative heat exposure. Thus, the associated pre-expanded cable accessory unit 50 is still suitable for the intended use.

FIG. 3B illustrates an electrical cable accessory system 5 after excessive heat exposure. As shown in FIG. 3B, the indicator area 20 of the time-temperature indicator 10 is darker in color than the reference area 24 (i.e., a change in visible appearance has occurred compared to the indicator area 20 of the electrical cable accessory system 5 in FIG. 3A), which indicates to a viewer that the electrical cable accessory system 5 (and associated pre-expanded cable accessory unit 50 contained within packaging 60) has experienced a threshold cumulative heat exposure for. Thus, indicating to the viewer that the pre-expanded cable accessory unit 50 is no longer suitable for its intended use.

Figure 5:
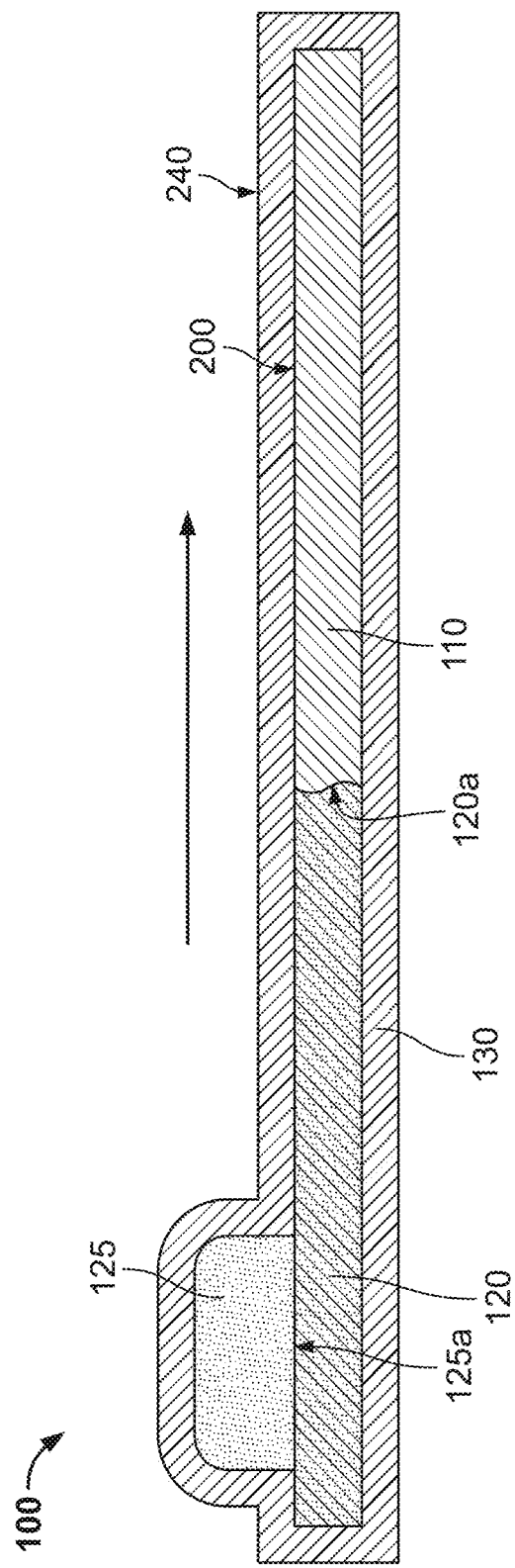
FIG. 5 is a side cross-sectional view of an alternative time-temperature indicator that may be utilized in the electrical cable accessory system of FIG. 1.
Figures 6A, 6B, 6C:
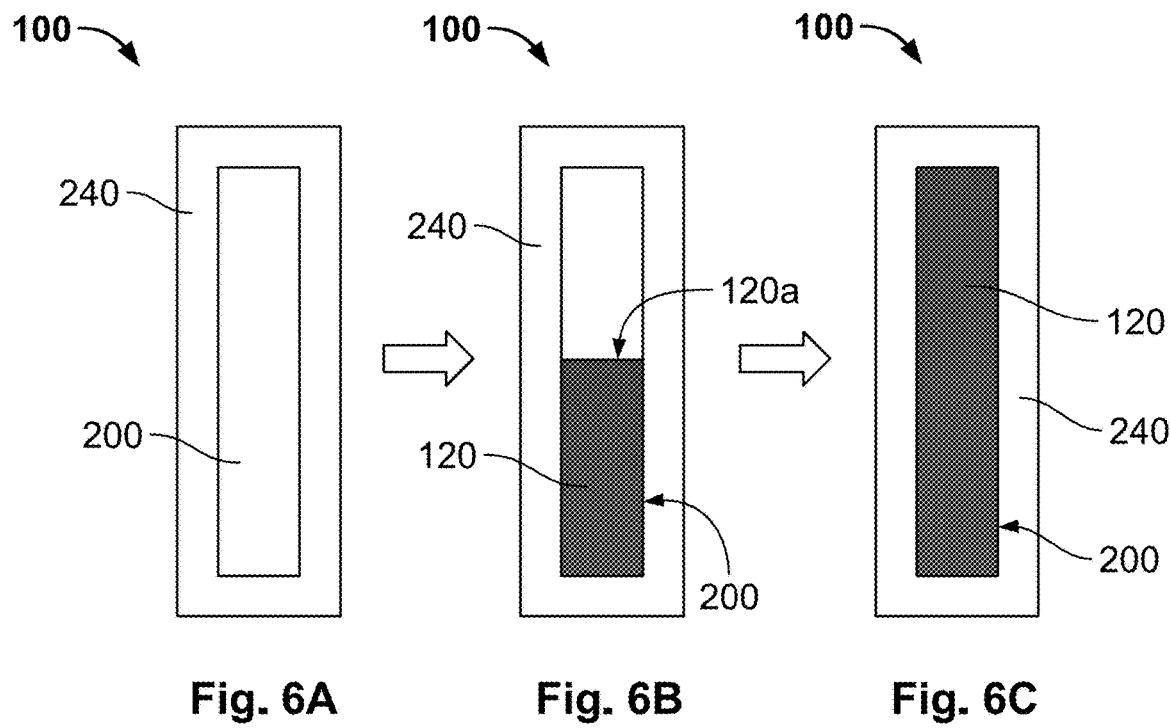
FIGS. 6A-6C illustrates the time-temperature indicator of FIG. 5 before heat exposure (A), during heat exposure (B), and after excessive heat exposure (C), according to embodiments of the present invention.
Figure 7:
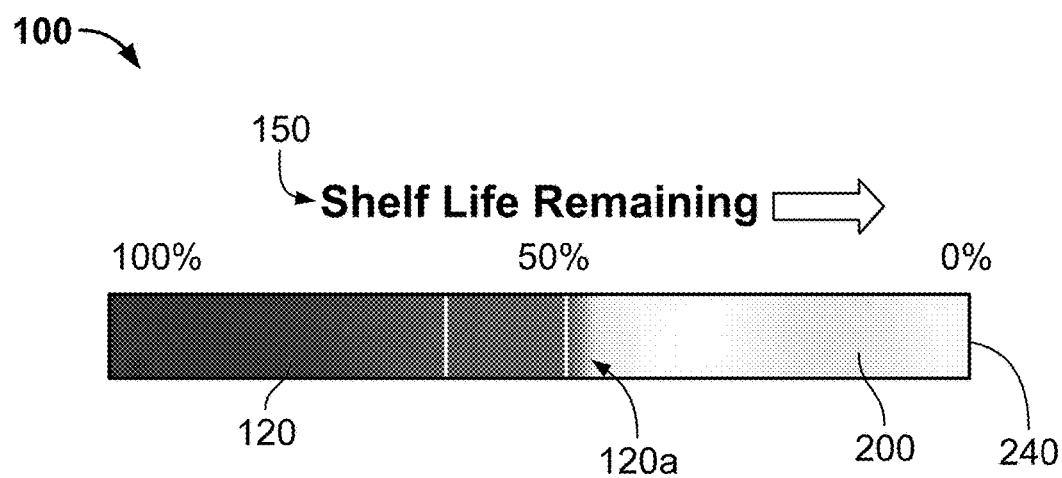
FIG. 7 illustrates example indicia that may be used on the time-temperature indicator of FIG. 5.

With reference to FIGS. 5-9B, the time-temperature indicator is a liquid migration (e.g., dye diffusion) indicator 100. Similar to the indicator 10 described herein, in some embodiments, the time-temperature indicator 100 may include a viewable indicator area 200 for viewing a visible change in appearance corresponding to the cumulative heat exposure. As shown in FIGS. 5-7, in some embodiments, the visible change in appearance may comprise a migrating color change along the indicator area 200. As shown in FIGS. 6A-6C, in some embodiments, the cumulative exposure indicator component of the time-temperature indicator 100 may be generated by a viscous liquid 120 that migrates along a migration medium 110 within the indicator area 200. In some embodiments, the color change occurs as the viscous liquid 120 migrates along the migration medium 110 (e.g., leading edge of color change 120a) which indicates the heat exposure to the time-temperature indicator 100 over time. The rate of progression that the viscous liquid 120 migrates along the migration medium 110 varies with temperature (and indirectly heat exposure). For example, the viscous liquid 120 will migrate (i.e., wick) faster at higher temperatures than at lower temperatures. The temperature indicator 100 tracks the varying temperature (I.e., heat) exposure over time to determine a threshold cumulative heat exposure with respect to the indictor 100 (and corresponding pre-expanded elastomeric cable accessory 52 for an electrical connection cover system 500).

In other embodiments, the time-temperature indicator 100 may track excessive heat exposure, i.e., when the temperature exceeds a predetermined threshold value (e.g., a critical temperature), which will trigger a visible change (e.g., the migration of the viscous liquid 120 along the migration medium 110) indicating the indicator 100 (and corresponding pre-expanded elastomeric cable accessory 52 for an electrical connection cover system 500) has been subjected or exposed to a critical temperature.

In some embodiments, the time-temperature indicator 100 comprises a first reservoir 125 which contains the viscous liquid 120. In some embodiments, the time-temperature indicator 100 may be activated by a user depressing the first reservoir 125 which forces the liquid 120 from the first reservoir 125 through an inlet 125a into a second reservoir 130 containing the migration medium 110. After activation, the liquid 120 travels from the first reservoir 125 to the second reservoir 130 and migrates along the length of the migration medium 110 over time, i.e., in the direction of the arrow (FIG. 5). FIG. 6A illustrates the indicator 100 before activation and heat exposure, FIG. 6B illustrates the indicator 100 after activation and during heat exposure, and FIG. 6C illustrates the indicator 100 after the indicator 100 has been subjected to a predetermined threshold cumulative heat exposure (i.e., after excessive heat exposure).

In some embodiments, the migration medium 110 may be a porous material such as a micro-porous polymer, for example, a polyolefin plastic (with a primarily silica filler) such as Teslin® (PPG Industries Inc., Pennsylvania, USA) or a polyethylene with a silica filler such as Artisyn™ (Daramic Inc., Owensboro, Kentucky, USA). The liquid 120 used can be any viscous liquid with the appropriate (e.g., red) coloration, for example, an edible oil such as corn oil containing an oil-soluble red-dye such as Oil Red EGN (Sigma-Aldrich, St. Louis, Missouri USA). See also, e.g., U.S. Pat. No. 7,232,253 to Isbitsky et al.

As shown in FIG. 7, in some embodiments, the reference area 240 may surround the indicator area 200 and comprise indicia 150 corresponding to, for example, the remaining shelf life based on the migration of the color change along the indicator area 200 (i.e., migration of the viscous liquid 120 along the migration medium 110). When substantially the entire indicator area 200 has changed color (or the color change has migrated to a respective indicia 150, i.e., 0% shelf life remaining), indicates to the viewer that the corresponding pre-expanded elastomeric cable accessory 52 for an electrical connection cover system 5, 500 has experienced the end of its shelf life (or has experienced a threshold cumulative heat exposure (see also, e.g., FIGS. 8A-8B).

Figure 8A:
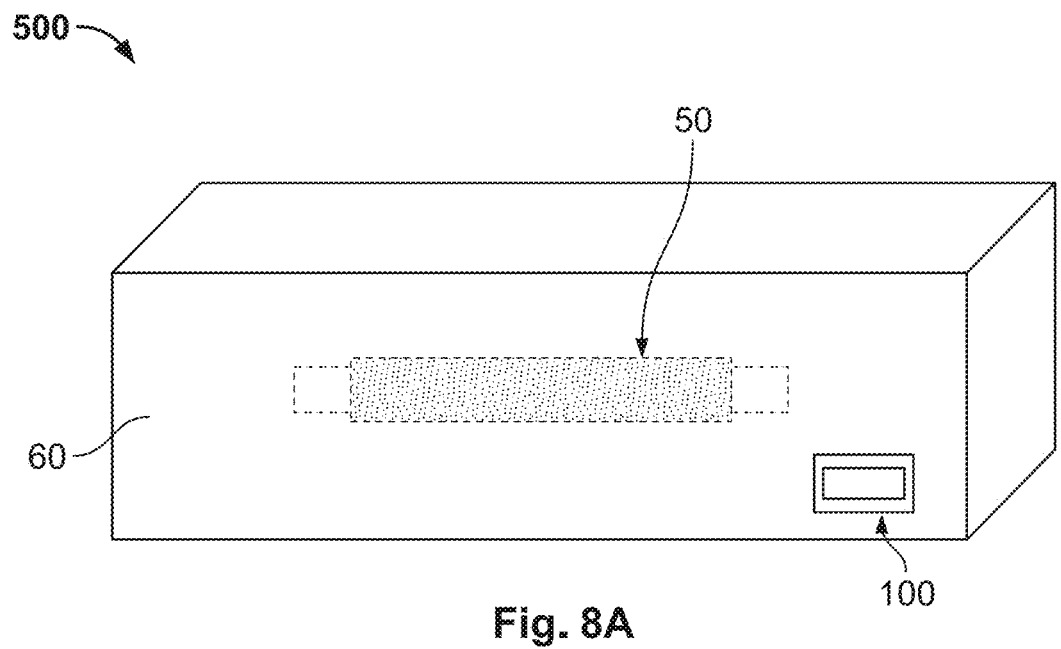
FIG. 8A illustrates the electrical cable accessory system of FIG. 1 before a threshold cumulative heat exposure has been reached, as shown by the time-temperature indicator of FIG. 5.
Figure 8B:
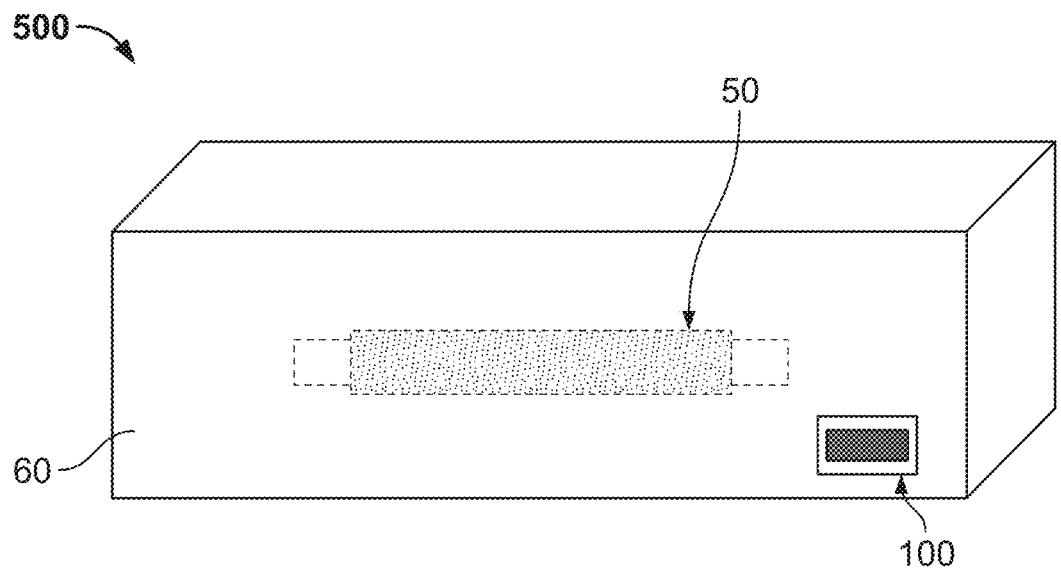
FIG. 8B illustrates the electrical cable accessory system of FIG. 1 after a threshold cumulative heat exposure has been reached, as shown by the time-temperature indicator of FIG. 5.

FIGS. 8A-8B show the time-temperature indicator 100 attached to the packaging 60 containing a pre-expanded cable accessory unit 50. FIG. 8A illustrates an electrical cable accessory system 500 unit before excessive heat exposure. A pre-expanded cable accessory unit 50 is stored within packaging 60 having a time-temperature indicator 100 attached to an outer surface of the packaging 60. As shown in FIG. 8A, the indicator area 200 of the time-temperature indicator 100 does not have any visible color change, which indicates to a viewer that the electrical cable accessory system 500 has not experienced a threshold cumulative heat exposure. Thus, the associated pre-expanded cable accessory unit 50 is still suitable for the intended use.

FIG. 8B illustrates an electrical cable accessory system 500 that has experienced a threshold cumulative heat exposure (i.e., after excessive heat exposure). As shown in FIG. 8B, the colored viscous liquid 120 has migrated along the entire indicator area 200 (i.e., migration medium 110) of the time-temperature indicator 100 (i.e., a change in visible appearance has occurred compared to the indicator area 200 of the electrical cable accessory system 500 in FIG. 8A), which indicates to a viewer that the electrical cable accessory system 500 (and associated pre-expanded cable accessory unit 50 contained within packaging 60) has experienced a threshold cumulative heat exposure (i.e., 0% shelf life remaining). Thus, indicating to the viewer that the pre-expanded cable accessory unit 50 is no longer suitable for its intended use.

Various configurations of the time-temperature indicators 10, 100 are possible. For example, in some embodiments, the indicator 10, 100 may be embodied as a self-adhesive configuration and may be suitable for attachment directly on a mass-produced host product (e.g., pre-expanded cable accessory unit 50)(see, e.g., FIGS. 4A-4B) or attached to the packaging 60 (or container) of the host product (see, e.g., FIG. 1, FIGS. 3A-3B, and FIGS. 8A-8B). The time-temperature indicator 10, 100 may be configured to be conformable with a host product, or packaging for a host product. The surface of the time-temperature indicator 10, 100 may be flat to conform with a flat surface of the host product (or to a package containing the host product).

Figure 4A:
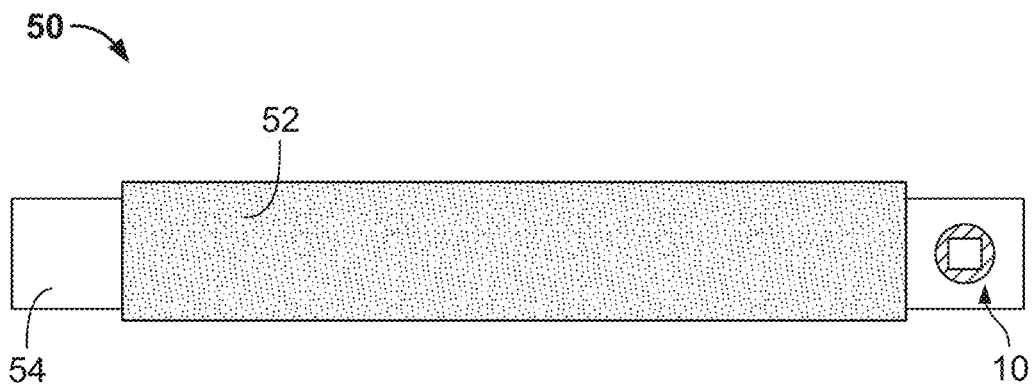
FIG. 4A is a side view of an example pre-expanded cable accessory unit with a time-temperature indicator secured to the holdout according to embodiments of the present invention.
Figure 4B:
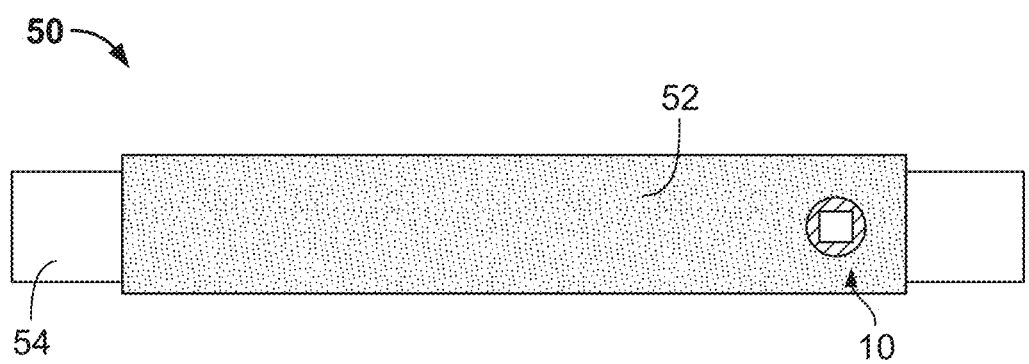
FIG. 4B is a side view of the pre-expanded cable accessory unit of FIG. 4A with the time-temperature indicator secured to the pre-expanded elastomeric cable accessory according to embodiments of the present invention.

Alternatively, the surface of the time-temperature indicators 10, 100 may be curved in one dimension, or in two dimensions, to conform to a curved surface of the host product (or of a package containing the host product), for example, the curved surface of a holdout 54 (see, e.g., FIG. 4A) or the curved surface of a pre-expanded elastomeric cable accessory 52 (see, e.g., FIG. 4B). Adhesive attachment is one example of different ways in which the indicator 10, 100 may be associated with a host product to monitor the host product for cumulative heat exposure. Possible different ways of attachment include, for example, adhering, tying, looping, and stapling, to the host product directly, or to a package containing the host product, or to a package, carton, box, or other container having a number of host product items there within. Further, a time-temperature indicator 10, 100 embodied in a label, or tag, may be inserted in a host product package, carton, or other container for one or more host product items.

In some embodiments, the electrical cable accessory system 5, 500 of the present invention may include a pre-expanded cable accessory unit 50 having more than one pre-expanded elastomeric cable accessory 52. For example, as shown in FIGS. 9A-9B, a pre-expanded cable accessory unit 50' may include two pre-expanded elastomeric cable accessories 52', 56'. In some embodiments, the elastomeric cable accessories 52', 56' may be formed of the same material. As such, the elastomeric properties of the cable accessories 52', 56' will degrade at similar rates. Therefore, a time-temperature indicator 10, 100 of the electrical cable accessory system 5, 500 will indicate to a viewer when both pre-expanded elastomeric elements included in the cable accessory unit 50' (i.e., cable accessories 52', 56') have experienced a threshold cumulative heat exposure.

This would be the same, for example, when the pre-expanded cable accessory unit 50' has more than two pre-expanded elastomeric cable accessories 52', 56' and each of the elastomeric cable accessories is formed of the same material. However, in some embodiments, the pre-expanded elastomeric cable accessories 52', 56' may be formed from different elastomeric materials that may degrade at different rates when exposed to heat (e.g., EDPM and silicone). In those embodiments, the time-temperature indicator 10, 100 would be configured to indicate to a viewer when the pre-expanded elastomeric cable accessory 52', 56' formed of the elastomeric material that degrades at a faster rate compared to the other pre-expanded elastomeric cable accessory 52', 56' of the cable accessory unit 50' has experienced a threshold cumulative heat exposure has been reached for. In other words, the time-temperature indicator 10, 100 will signal the cumulative heat exposure (and threshold cumulative heat exposure) of the weakest or most sensitive pre-expanded elastomeric cable accessory 52', 56' of the pre-expanded cable accessory unit 50, 50'.

As described above, the electrical cable accessory systems 5, 500 of the present invention include a pre-expanded cable accessory unit 50, a time-temperature indicator 10, 100, and optionally, packaging 60 for the pre-expanded cable accessory unit 50. The electrical cable accessory systems 5, 500 allow a user to monitor the cumulative heat exposure to pre-expanded cable accessory units 50, 50' and elements thereof (i.e., pre-expanded elastomeric cable accessory 52, 52', 56') and/or the packaging 60 containing the pre-expanded cable accessory units 50, 50'.

The pre-expanded elastomeric cable accessories 52, 52', 56' described herein may be any suitable type of elastomeric cable accessory system 5, 500 (and pre-expanded cable accessory unit 50, 50'). In some embodiments, the pre-expanded elastomeric cable accessory 52, 52', 56' is a tubular elastomeric cover sleeve. In some embodiments, the pre-expanded elastomeric cable accessory 52, 52', 56' is a joint body, a termination cover, an elbow, a re-jacket sleeve, a breakout sleeve, a cable adapter, or other cable accessory.

The pre-expanded cable accessory unit 50, 50' may include other components mounted on the holdout 54 in addition to the pre-expanded elastomeric cable accessory 52, 52', 56'. In some embodiments, the pre-expanded cable accessory unit 50, 50' further includes a second elastomeric cable accessory 52, 52', 56' mounted on the holdout 54 such that the holdout 54 holds the second elastomeric cable accessory 52, 52', 56' in an elastically expanded (e.g., radially expanded) state as well (see, e.g., elastomeric cable accessory 56' shown in FIGS. 4A-4B). For example, the pre-expanded cable accessory unit 50, 50' may include a pre-expanded joint body mounted on (and held expanded by) the holdout 54 as a first expanded elastomeric cable accessory 52', and a re-jacket sleeve mounted on (and held expanded by) the holdout as a second expanded elastomeric cable accessory 56'. Additional, non-elastomeric or non-elastically expanded components may be mounted on the holdout as well, such as a metal shield mesh sleeve. Exemplary pre-expanded cable accessory units are described in, for example, U.S. Pat. No. 9,870,848 to Iyer, U.S. Pat. No. 10,283,878 to Newman, and U.S. Pat. No. 8,889,989 to Maher, the disclosures of which are incorporated by reference herein in their entireties.

In some embodiments, the pre-expanded cover units 50, 50' described herein may be provided as part of a pre-packaged kit of components for subsequent assembly by an installer (e.g., a field installer). In some embodiments, time-temperature indicator 10, 100 may be secured to the packaging 60 containing the components of the kit (see, e.g., FIGS. 3A-3B and FIGS. 8A-8B).

The electrical cable accessory systems 5, 500 described herein can address problems and concerns associated with aging and degradation of pre-expanded elastomeric cable accessories 52, 52', 56' provided in pre-expanded cable accessory units 50, 50'. As shown above, the pre-expanded cable accessory units 50, 50' (e.g., cold shrink cover sleeves) rely on stretched elastomeric materials (i.e., pre-expanded cable accessories 52, 52', 56') to properly seal the interface between, for example, a cable and the cable accessory 52, 52', 56'. Over time, the elastomeric materials that form the cable accessory 52, 52', 56' relax (e.g., the elastomeric properties or tension set characteristics degrade) based on time and temperature exposure. Eventually, the relaxation of the elastomeric material reaches a limit (threshold) such that the pre-expanded cable accessory unit 50, 50' can no longer function effectively (e.g., no longer provide the necessary radial pressure to seal the interface between the cable and the cable accessory 52, 52', 56'). Once a cold shrink cable accessory has experienced excessive heat exposure, it may no longer retain sufficient resilience to apply the intended minimum amount of compression pressure to the substrate(s)(e.g., the cable). Thus, the pre-expanded cable accessory units 50', 50' have a finite shelf life based on their tension set characteristics as the elastomeric properties (I.e., the compressive or clamping force or pressure due to elastic tension) degrade (or relax) over a period of time when exposed to excessive heat. For example, once the cable accessories 52, 52', 56' has reached a threshold for cumulative heat exposure, the cable accessories 52, 52', 56' will no longer be able to provide the necessary compressive or clamping force or pressure to properly and/or effectively seal the interface with the cable (or other connection). This compression may be important or critical to ensure proper sealing and/or dielectric strength.

For this reason, such products are commonly provided with an expiration date that roughly estimates the effective shelf life of the cold shrink cable accessory 52, 52', 56' (and associated pre-expanded cable accessory unit 50, 50'). Because the manufacture cannot predict the actual conditions of handling and storing the product, the expiration date may be based on conservative assumptions. In some instances, the shelf life of the pre-expanded elastomeric cable accessory unit 50, 50' is estimated to be approximately two (2) years at 40° C. (104° F.). This approximated shelf life assumes that the pre-expanded elastomeric cable accessory unit 50, 50' has been stored at a continuous temperature exposure of 40° C. (104° F.) for two years. However, this assumption of continuous temperature exposure is not realistic for how the vast majority of pre-expanded cable accessory units 50, 50' are stored. As a result, a pre-expanded cable accessory unit 50, 50' may reach its expiration date before its pre-expanded cable accessory 52, 52', 56' has in fact relaxed or heat aged beyond its effective limit.

The time-temperature indicator 10, 100 of the electrical cable accessory systems 5, 500 described herein address this problem by providing a more accurate and individualized assessment, indication or measurement of the heat aging of the pre-expanded cable accessory 52, 52', 56' of the associated pre-expanded cable accessory unit 50, 50'. Therefore, it would be beneficial to incorporate a time-temperature indicator 10, 100 with the pre-expanded cable accessory unit 50, 50' or packaging 60 containing the pre-expanded cable accessory unit 50, 50' or a pre-packaged kit of components during storage to accurately monitor the cumulative heat exposure and indicate to a viewer when the threshold cumulative heat exposure where the pre-expanded elastomeric cable accessory 52, 52', 56' has experienced a decline in its elastomeric properties. Thus, the time-temperature indicator 10, 100 can serve as a shelf life indicator for the cable accessory unit 50, 50', and form a shelf life indicator system (or a part of a shelf life indicator system) of the electrical cable accessory system 5, 500.

The time-temperature-tension set clock begins when the pre-expanded cable accessory system 50, 50' (I.e., the pre-expanded elastomeric cable accessory 52, 52', 56') is expanded, and therefore the time-temperature indicator 10, 100 should be started or activated to coincide with the expansion process to accurately reflect the shelf life of the corresponding the pre-expanded cable accessory system 50, 50'.

It is noted that the electrical cable accessory systems 5, 500 described herein (and associated time-temperature indicator 10, 100) may also include (or be used) with non-expanded units or non-cold shrink products.

Methods for monitoring cumulative heat exposure to a pre-expanded elastomeric cable accessory unit for covering an electrical cable and/or cable connection are provided. As shown in the flow diagram in FIG. 10, in some embodiments, the method may comprise the step of providing an electrical cable accessory system. The electrical cable accessory system may include a pre-expanded cable accessory unit including a pre-expanded cable accessory formed of an elastomeric material and a removable holdout mounted within the elastomeric cable accessory, wherein the holdout is operative to maintain the elastomeric cable accessory in an expanded state and to permit the elastomeric cable accessory to elastically contract when the holdout is removed from the elastomeric cable accessory. The pre-expanded cable accessory unit may further include a time-temperature indicator associated with the pre-expanded cable accessory unit, wherein the time-temperature indicator is configured to undergo a visible change in appearance in response to a cumulative heat exposure (block 400). The method may further include the step of monitoring the visible change in appearance of the time-temperature indicator to determine whether the elastomeric material of the pre-expanded elastomeric cable accessory unit has experienced a threshold cumulative heat exposure (block 401).

Methods of making an electrical cable accessory system for monitoring cumulative heat exposure to a pre-expanded elastomeric cable accessory unit are also provided. As shown in the flow diagram in FIG. 11, in some embodiments, the method may comprise the step of providing an electrical cable accessory system. The electrical cable accessory system may include a pre-expanded cable accessory unit including a pre-expanded cable accessory formed of an elastomeric material and a removable holdout mounted within the elastomeric cable accessory, wherein the holdout is operative to maintain the elastomeric cable accessory in an expanded state and to permit the elastomeric cable accessory to elastically contract when the holdout is removed from the elastomeric cable accessory. The pre-expanded cable accessory unit further include a time-temperature indicator associated with the pre-expanded cable accessory unit, wherein the time-temperature indicator is configured to undergo a visible change in appearance in response to a cumulative heat exposure (block 500). The method may further include the step of affixing the time-temperature indicator to the pre-expanded cable accessory unit or to a packaging containing the pre-expanded cable accessory unit (block 501).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method for monitoring cumulative heat exposure to a pre-expanded elastomeric cable accessory unit for covering an electrical cable or cable connection, the method comprising:
    providing an electrical cable accessory system including:
        a pre-expanded cable accessory unit including:
            a pre-expanded cable accessory formed of an elastomeric material; and
            a removable holdout mounted within the elastomeric cable accessory, wherein the holdout is operative to maintain the elastomeric cable accessory in an expanded state and to permit the elastomeric cable accessory to elastically contract when the holdout is removed from the elastomeric cable accessory; and a time-temperature indicator associated with the pre-expanded cable accessory unit, wherein the time-temperature indicator is configured to undergo a visible change in appearance in response to a cumulative heat exposure; and monitoring the visible change in appearance of the time-temperature indicator to determine whether the elastomeric material of the pre-expanded elastomeric cable accessory unit has experienced a threshold cumulative heat exposure over a period of time of 60 days or more.

2. The method of claim 1, wherein the time-temperature indicator comprises an indicator area and a reference area, the indicator area configured to undergo a visible change in appearance in response to the cumulative heat exposure.

3. The method of claim 2, wherein the time-temperature indicator comprises a viscous liquid and a migration medium, and wherein the visible change in appearance comprises the migration of the viscous liquid along the migration medium within the indicator area.

4. The method of claim 3, wherein, when the viscous liquid has migrated throughout the entire indicator area, the elastomeric material of the pre-expanded elastomeric cable accessory unit has experienced a threshold cumulative heat exposure.

5. The method of claim 1, wherein the time-temperature indicator is affixed to the pre-expanded cable accessory unit or to a packaging containing the pre-expanded cable accessory unit.

6. The method of claim 1, wherein the pre-expanded cable accessory is a cold shrinkable cover sleeve.

7. The method of claim 1, wherein the time-temperature indicator is a thermochromic indicator.

8. The method of claim 1, wherein the time-temperature indicator is a liquid migration or dye diffusion indicator.

9. The method of claim 1, wherein the visible change in appearance of the time-temperature indicator determines when the elastomeric material forming the pre-expanded cable accessory has experienced a threshold cumulative heat exposure.

10. A method for monitoring cumulative heat exposure to a pre-expanded elastomeric cable accessory unit for covering an electrical cable or cable connection, the method comprising:

providing an electrical cable accessory system including:
a pre-expanded cable accessory unit including:
a pre-expanded cable accessory formed of an elastomeric material; and
a removable holdout mounted within the elastomeric cable accessory, wherein the holdout is operative to maintain the elastomeric cable accessory in an expanded state and to permit the elastomeric cable accessory to elastically contract when the holdout is removed from the elastomeric cable accessory; and
a time-temperature indicator associated with the pre-expanded cable accessory unit, wherein the time-temperature indicator is configured to undergo a visible change in appearance in response to a cumulative heat exposure; and monitoring the visible change in appearance of the time-temperature indicator to determine whether the elastomeric material of the pre-expanded elastomeric cable accessory unit has experienced a threshold cumulative heat exposure, wherein the threshold cumulative heat exposure for the pre-expanded cable accessory unit is about 40° C. (104° F.) over a time period of about 730 days.

11. A method for monitoring cumulative heat exposure to a pre-expanded elastomeric cable accessory unit for covering an electrical cable or cable connection, the method comprising:

providing an electrical cable accessory system including:
a pre-expanded cable accessory unit including:
a pre-expanded cable accessory formed of an elastomeric material; and
a removable holdout mounted within the elastomeric cable accessory, wherein the holdout is operative to maintain the elastomeric cable accessory in an expanded state and to permit the elastomeric cable accessory to elastically contract when the holdout is removed from the elastomeric cable accessory; and
a time-temperature indicator associated with the pre-expanded cable accessory unit, wherein the time-temperature indicator is configured to undergo a visible change in appearance in response to a cumulative heat exposure; and monitoring the visible change in appearance of the time-temperature indicator to determine whether the elastomeric material of the pre-expanded elastomeric cable accessory unit has experienced a threshold cumulative heat exposure, wherein the threshold cumulative heat exposure for the pre-expanded cable accessory unit is about 60° C. (140° F.) over a time period of about 60 days.

* * * * *